UNITED STATES PATENT OFFICE.

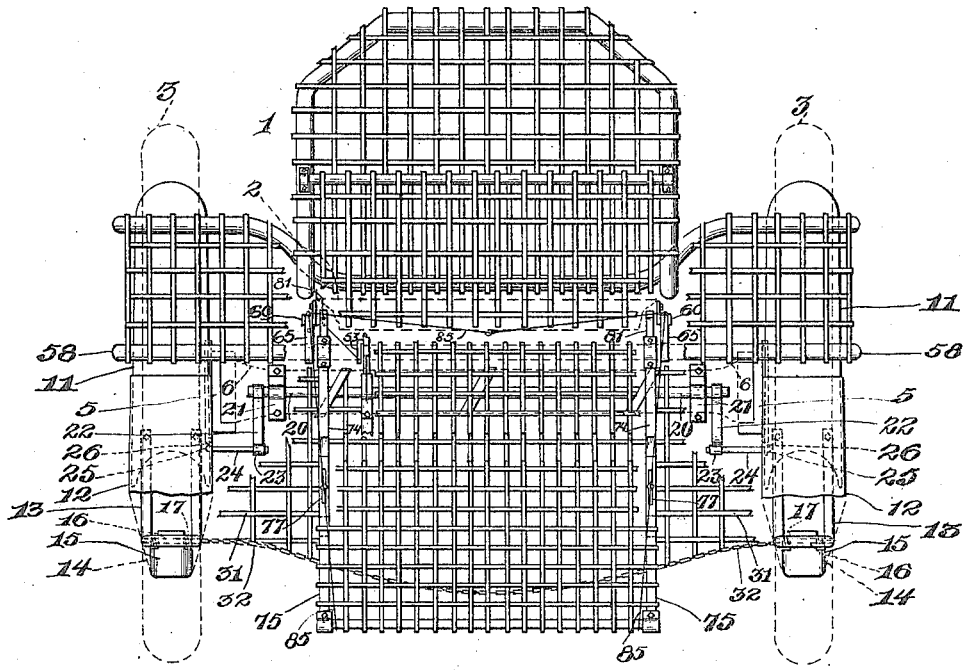
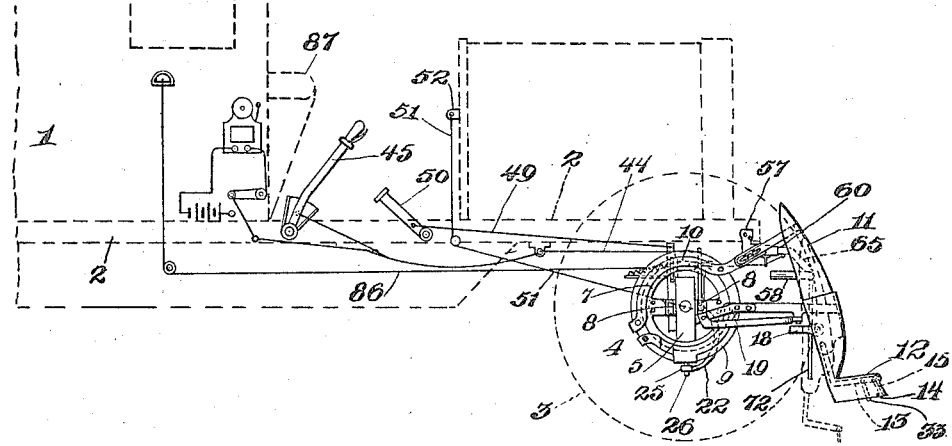

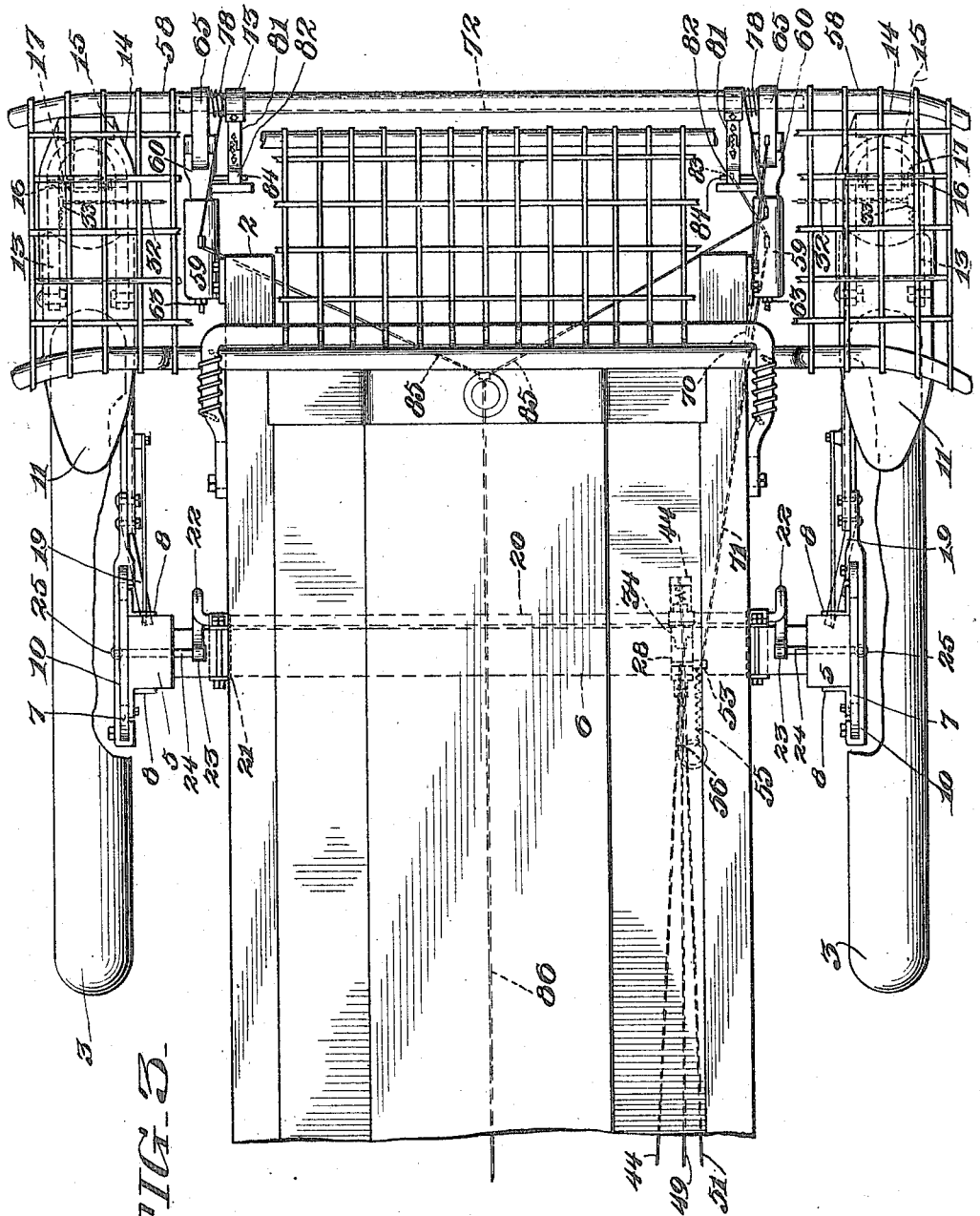

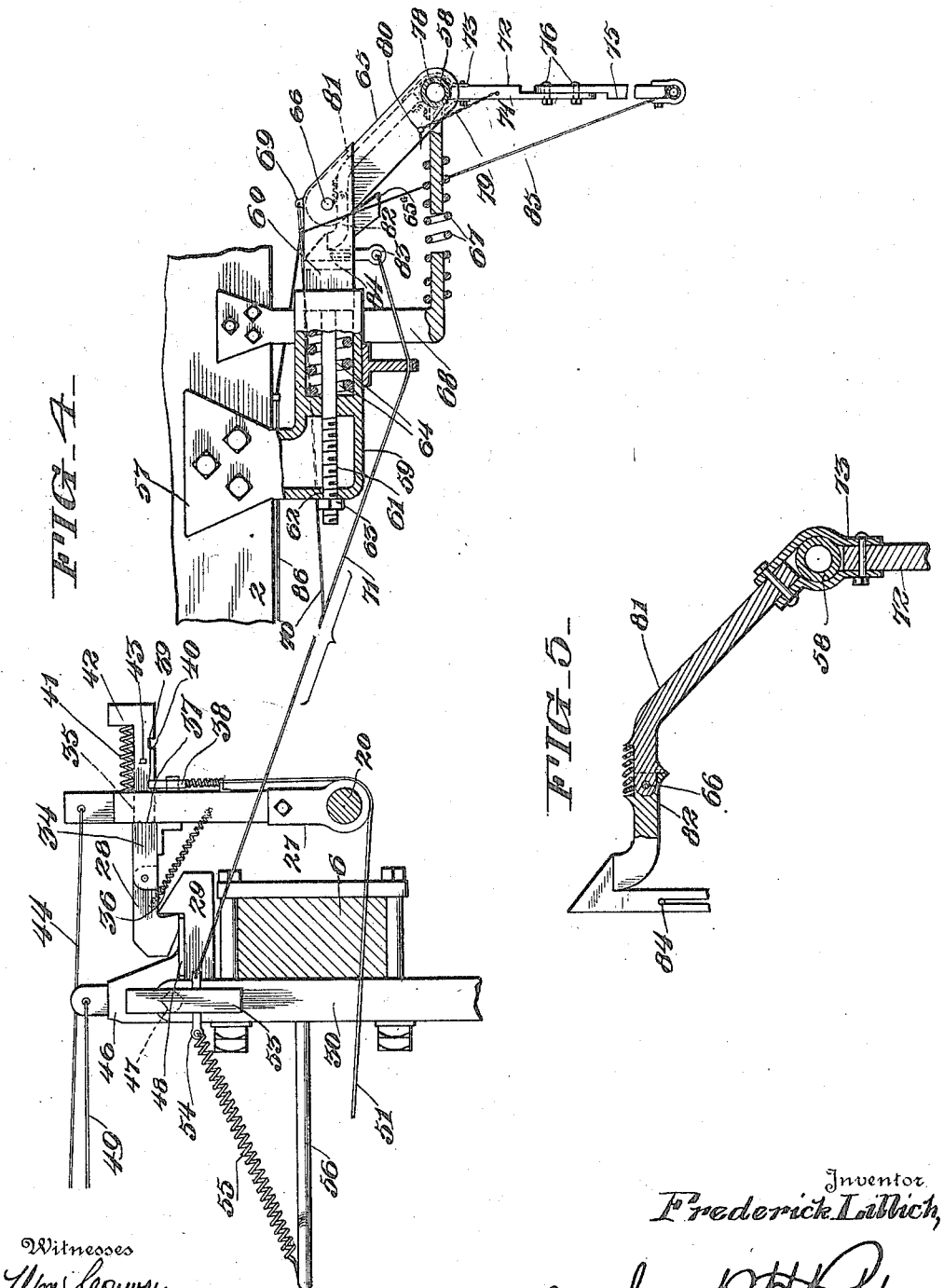

FREDERICK LILLICH, OF PHILADELPHIA, PENNSYLVANIA, ASSIGNOR TO LILLICH FENDER COMPANY, OF PHILADELPHIA, PENNSYLVANIA.

FENDER.

1,187,750. Specification of Letters Patent. Patented June 20, 1916.

Application filed November 15, 1915. Serial No. 61,547.

*To all whom it may concern:*

Be it known that I, FREDERICK LILLICH, a citizen of the United States, residing at Philadelphia, in the county of Philadelphia and State of Pennsylvania, have invented certain new and useful Improvements in Fenders, of which the following is a specification.

My invention relates to improvements in fenders, and more particularly to a fender for automobiles, the object of the invention being to provide an improved construction and arrangement of tripping fender which causes the release and fall of wheel guards and a scoop fender when the tripping fender engages a person or object, so that the guards and scoop fender fall into operative position automatically upon the engagement of the tripping fender.

A further object is to provide an improved construction of tripping fender which may be adjusted vertically in accordance with the desire of the operator and the condition of the street or roadway on which the vehicle is used.

A further object is to provide a tripping fender which is supported upon the bumper rod of the automobile, whereby it is located in a forward position to engage a person or object in advance of the other parts of the vehicle.

With these and other objects in view, the invention consists in certain novel features of construction and combinations and arrangements of parts as will be more fully hereinafter described and pointed out in the claims.

In the accompanying drawings: Figure 1 is a view in elevation of the front end of an automobile showing my improvements in position thereon, parts of the fender structure being broken away to illustrate details. Fig. 2 is a view in side elevation showing the mounting of the wheel guards and coöperating parts, the automobile being illustrated in dotted lines and certain features of the fender omitted for purposes of clearness. Fig. 3 is a top plan view, parts of the fender and automobile being broken away to illustrate details. Fig. 4 is a view in side elevation illustrating the mounting of the tripping fender and bumper bar, and also showing the connection of the parts with the holding mechanism, and Fig. 5 is an enlarged detail view illustrating the catch releasing means operated by the tripping fender.

1 represents an automobile having the ordinary frame 2.

3 represents the wheels of the automobile, the front wheels being mounted on the ordinary stubs 4 which are fixed to forks 5 on front axle 6. To both of the forks 5 on the front axle, I secure rings 7 by means of brackets 8, so that the rings 7 are held against movement.

Rings 9 are mounted to turn on the periphery of the stationary rings 7 and bars 10 are secured to the outer rings 9 and support my improved wheel guards 11.

The structure of each wheel guard and its coöperating parts is precisely the same, and the description hereinafter of one will apply alike to both.

The wheel guard at its lower end is provided with a shoe 12 which is preferably of relatively heavy rubberized cloth or similar fabric and is supported by a frame 13 secured to the guard 11. This frame 13 and the shoe 12 of which the frame is a part, project in a general forward direction and constitute a scoop to pick up the arm or leg of a person on the ground and prevent the same from passing into engagement with the wheel.

As a further protection, the shoe 12 has an apron 14 which hangs all around the frame 13, and is held in normal position by a spring tongue 15. This spring tongue 15 is pivotally connected to frame 13 as shown clearly in Fig. 2. That is to say, a transverse pin 16 is projected through the frame, and the tongue 15 is pivotally mounted on the pin and is provided with coiled springs 17 which tend to hold the tongue in a general forward direction and return the same to such position in the event the shoe comes in contact with a hard or immovable part of the pavement.

The guard 11 is provided on one side with an arm 18 which strikes against the side of the wheel when the guard receives a lateral blow, preventing breaking of the guard and an arm 19 which is secured to the guard is adapted to engage the fork 5 and limit the downward movement of the guard.

A shaft 20 is mounted in bearings 21 on the front face of front axle 6, and is provided at its ends with crank arms 22. These crank arms, at their free ends, are provided with sleeves 23 in which laterally projecting pins 24 are mounted, and are provided at their free ends with eyes 25 receiving downwardly projecting pins 26 on the lower bars 10, so that when the shaft is turned it causes the bars 10 and movable rings 9 to move and elevate or lower the guards 11 as the case may be.

An upwardly projecting crank arm 27 is fixed to shaft 20, and carries a catch 28 adapted to engage a stationary catch member 29, the latter fixed to a clamp 30 secured to axle 6. The movable and stationary catch members 28 and 29 have beveled ends so that they can readily ride into locked engagement, and when in locked engagement, hold the guards in an elevated position as shown in full lines in Fig. 2.

A scoop fender 31 is connected at one end to the axle 6, at its ends to the guards 11, and is provided at its lower edge with a chain 32 which is connected at its ends to spring-pressed fingers 33 carried by the frames 13 of guards 11.

It will therefore be noted that when the wheel guards 11 are held in an elevated position by means of the catch 28, the scoop fender 31 will likewise be elevated. The catch member 28 is pivotally connected to a bar 34 which is mounted to slide in a slot 35 in arm 27. A spring 36 connects the latch 28 with arm 27 and draws the latch downwardly into its normal holding position.

A shoulder 37 on the bar engages the arm and limits the movement of the bar in one direction. A spring bolt 38, carried by arm 27, engages in either of a pair of notches 39 and 40 respectively in the lower edge of bar 34, and a coiled spring 41 is located between a lug 42 on bar 34 and the arm 27 tending to move the bar in a direction to press the shoulder 37 against the arm 27. A stop 43 on bar 34 limits the movement of the bar in the opposite direction. By means of this arrangement of bar 34 and coöperating parts, the position of the wheel guards and scoop fender can be adjusted or varied in accordance with the condition of the road over which the vehicle is moving which will be more fully hereinafter described.

A cable 44 is connected to the free end of arm 27, and is operated by a lever or other suitable device 45 to turn shaft 20 and move the fender to elevated position, so that the catch 28 can engage member 29 and hold the fender in this position.

To release the catch member 27 from engagement with the fixed catch member 29, I provide an angle lever 46 which is pivotally connected at its angle to clamp 30 by means of a pivot bolt 47. One end 48 of this angle lever projects under the catch member 28, so that when the angle lever is moved in one direction, it will lift the catch member 28 far enough to release it from member 29.

A cable 49 connects the lever 48 with a foot pedal 50, so that when the latter is operated, the catch 28 can be released. A cable 51 is connected to the spring-pressed bolt 38, and terminates in a handle 52 which can be moved by the operator to release the bolt 38 from engagement with one of the notches 39 or 40.

With the parts as shown in Fig. 2, the wheel guards are in their highest position. If it is desired to lower them slightly, it is simply necessary to exert a pull on the cable 51, drawing the bolt 38 out of notch 39, when the weight of the wheel guards and connected parts will cause the arm 28 to swing in a direction to move notch 40 into register with bolt 38, when the operator can release cable 51 and allow the bolt 38 to spring into the notch 40. To return bar 34 to its former position, it is simply necessary while the catch 28 is disengaged from member 29 to exert a pull on the bolt 38. As soon as the bolt 38 is released from notch 40, spring 41 will move the bar 34 longitudinally until shoulder 37 strikes arm 27. When the bolt 38 is released, it will spring into notch 39, and hold the parts in such position of adjustment.

A downwardly projecting arm 53 on angle lever 46 is provided with a transverse eye-bolt 54, one end of which is connected by a coiled spring 55 with a fixed arm 56 on clamp 30. This spring 55 holds the lever 46 in normal position, and returns it to such position when cable 49 is released.

A pair of brackets 57 are bolted to the forward end of the automobile frame 2, and support my improved bumper rod 58 as will now be explained.

The brackets 57 have tubular portions 59 into which forked members 60 telescope. These members 60 have screw-threaded bolts 61 thereon extending through openings 62 in the angle brackets 57, and provided with nuts 63 to adjust the said members.

Coiled springs 64 in the tubular portions 59 of the brackets 57 exert an outward pressure on the members 60, and cushion the bumper rod as will be apparent. The outer ends of the members 60 are bifurcated and links 65 are pivotally connected in the bifurcated outer ends of the members 60 by means of pins 66, and said links 65 at their forward and lower ends, support the bumper rod 58. This bumper rod is held in its forward normal position by means of relatively strong coiled springs 67 which are positioned between the bumper rod and brackets 68 secured to frame 2. These springs 67 sustain the initial shock of impact of bumper rod 58.

The pivotal movement of each link 65 is limited by a lug 65ª on the under face of the bar 60, which is engaged by the link 65, so that springs 64 are compelled to sustain the greater portion of the shock.

A finger 69 on the upper end of one of the links 65 is connected by a cable 70 with a cable 71, the last-named cable being secured to the eye-bolt 54, so that when the bumper rod 58 is moved inwardly to cause the link 65 to pivot, the lever 46 will be moved so as to release the catch 28.

The bumper 58 supports a tripping fender 72 which is pivotally connected to the bar at its upper end by means of collars 73, and is made preferably of two sections 74 and 75 which are adjustably connected by bolts 76 so as to permit the tripping fender a vertical adjustment.

The two sections 74 and 75 of the tripping fender have slots 77 to receive the bolts 76, and limit the movement of the sections relative to each other, and I would have it understood that this connection is a loose one, so that the lower section 75 can be easily elevated as will be hereinafter pointed out.

Coiled springs 78 around the rod 58 exert a pressure on the tripping fender 72, holding the latter in its forward position, and chains 79 connect the tripping fender with links 65, and limit the forward movement of the tripping fender, allowing of a certain amount of adjustment by positioning the various links of the chain on hooks 80 on the links 65. The tripping fender 72 is provided with an arm 81 having a pivoted spring-pressed dog 82 engaging under a hook 83 which is slidably connected to one of the members 60 by means of a pin 84 which extends through a slot in the hook 83 and limits its movement. The cable 71 above referred to is secured to this hook 83, so that when the hook is elevated by the rearward pivotal movement of the tripping fender, it will move the lever 46 to release catch 28, hence when the tripping fender strikes a person or object, it will be moved rearwardly and cause the release of catch 28 and the fall of wheel guards 11 and scoop fender 31 as will be readily understood.

To enable the operator on the vehicle to elevate the tripping fender 72, I have shown cables 85 which connect to the lower section 75 of the tripping fender, and are operated by a single cable 86 which terminates close to the driver's seat 87, and which when given a pull will cause the lower section 75 to elevate. This is desirable when moving over rough roads, but in ordinary travel over city streets there is no necessity of elevating the lower section of the tripping fender. It will therefore be noted that with my improvements the wheel guards 11 and scoop fender 31 can be dropped by the driver of the automobile by operating foot lever 50 or they will be automatically dropped when the bumper 58 or tripping fender 72 strikes a person or object, hence the fender is operated either manually or automatically.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with an automobile, of pivoted wheel guards on the automobile, means normally holding the wheel guards in elevated position, and a tripping fender, cushioned means supporting the fender, said fender adapted when moved to release the wheel guard holding means and permit the wheel guards to fall, substantially as described.

2. The combination with an automobile, pivoted wheel guards on the automobile, and means normally holding the wheel guards in elevated position, of a bumper rod on the automobile, a tripping fender pivotally supported on the bumper rod, and means operated by the tripping fender for releasing the wheel guard holding means, substantially as described.

3. The combination with an automobile, pivoted wheel guards on the automobile, and means normally holding the wheel guards in elevated position, of a cushioned bumper rod, a tripping fender pivotally supported on the bumper rod, and means operated by the tripping fender for releasing the guard holding means, substantially as described.

4. The combination with an automobile, pivoted wheel guards on the automobile, and means normally holding the wheel guards in elevated position, of elastically supported links connected to the automobile, a bumper rod supported by the links, a tripping fender pivotally supported on the bumper rod, and means operated by the tripping fender for releasing the wheel guard holding means, substantially as described.

5. The combination with an automobile, pivoted wheel guards on the automobile, and means normally holding the wheel guards in elevated position, of elastically supported links connected to the automobile, a bumper rod supported by the links, a tripping fender pivotally supported on the bumper rod, springs normally holding the tripping fender in vertical position, chains limiting the forward movement of the tripping fender, and means operated by the rearward movement of the tripping fender to release the wheel guard holding means, substantially as described.

6. The combination with an automobile, vertically movable wheel guards connected thereto, and a catch normally holding the wheel guards in elevated position, of a bumper rod on the automobile, a tripping fender pivotally connected to the bumper rod, a movable hook connected to the catch and adapted when moved in one direction to release the catch, an arm on the tripping fender, and a pivoted dog engaging the catch, whereby the rearward movement of the tripping fender causes the movement of the hook and the release of the catch, substantially as described.

7. The combination with an automobile, vertically movable wheel guards connected thereto, and a catch normally holding the wheel guards in elevated position, of a bumper rod on the automobile, a tripping fender pivotally connected to the bumper rod and controlling the catch, said tripping fender comprising two sections, one movable vertically relative to the other, and means adjacent the automobile seat for moving the lower member of the tripping fender to elevate the same, substantially as described.

In testimony whereof I have signed my name to this specification in the presence of two subscribing witnesses.

FREDERICK LILLICH.

Witnesses:
C. R. ZIEGLER,
C. E. POTTS.

Copies of this patent may be obtained for five cents each, by addressing the "Commissioner of Patents, Washington, D. C."